United States Patent [19]

DeMartino

[11] Patent Number: 4,779,961
[45] Date of Patent: Oct. 25, 1988

[54] POLYMERS WITH PENDANT SIDE CHAINS EXHIBITING NON-LINEAR OPTICAL RESPONSE

[75] Inventor: Ronald N. DeMartino, Wayne, N.J.

[73] Assignee: Hoechst Celanese Corporation, Somerville, N.J.

[21] Appl. No.: 58,414

[22] Filed: Jun. 5, 1987

[51] Int. Cl.$^4$ ............................................. G02F 1/13
[52] U.S. Cl. ........................ 350/350 R; 252/299.01; 307/425; 350/96.34; 350/355; 350/356; 350/357; 526/258; 526/263
[58] Field of Search .......................... 526/258, 263; 350/96.29, 96.34, 355, 356, 357, 350 R; 307/425, 426, 427, 428, 430, 429; 252/299.01

Primary Examiner—C. Warren Ivy
Assistant Examiner—A. H. Walker
Attorney, Agent, or Firm—DePaoli & O'Brien

[57] ABSTRACT

This invention provides novel polyvinyl polymers with pendant side chains which exhibit nonlinear optical response. The polymers have utility as a transparent optical component of optical switch or light modulator devices.

An invention polymer is illustrated by a side chain liquid crystalline polymer of the following structure:

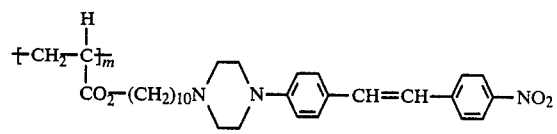

21 Claims, No Drawings

POLYMERS WITH PENDANT SIDE CHAINS EXHIBITING NON-LINEAR OPTICAL RESPONSE

CROSS-REFERENCE TO RELATED APPLICATIONS

The subject matter of this patent application is related to that disclosed in patent application Ser. Nos. 822,090; 822,092, U.S. Pat. Nos. 4,694,066; 822,093; and 822,094; filed Jan. 24, 1986; and patent application Ser. No. 068,678, filed July 1, 1987.

BACKGROUND OF THE INVENTION

It is known that organic and polymeric materials with large delocalized $\pi$-electron systems can exhibit nonlinear optical response, which in many cases is a much larger response than by inorganic substrates.

In addition, the properties of organic and polymeric materials can be varied to optimize other desirable properties, such as mechanical and thermoxidative stability and high laser damage threshold, with preservation of the electronic interactions responsible for nonlinear optical effects.

Thin films of organic or polymeric materials with large second order nonlinearities in combination with silicon-based electronic circuitry have potential as systems for laser modulation and deflection, information control in optical circuitry, and the like.

Other novel processes occurring through third order nonlinearity such as degenerate four-wave mixing, whereby real-time processing of optical fields occurs, have potential utility in such diverse fields as optical communications and integrated circuit fabrication.

Nonlinear optical properties of organic and polymeric materials was the subject of a symposium sponsored by the ACS division of Polymer Chemistry at the 18th meeting of the American Chemical Society, September 1982. Papers presented at the meeting are published in ACS Symposium Series 233, American Chemical Society, Washington, D.C. 1983.

The above-recited publications are incorporated herein by reference.

Of more specific interest with respect to the present invention embodiments is prior art relating to side chain liquid crystalline polymers, such as the five articles published on pages 275-368 of Polymeric Liquid Crystals, edited by A. Blumstein (Plenum Publishing Corporation, New York, 1985).

Makromol, 179, 2541(1978) by H. Finkelmann et al describes a model consideration for liquid crystalline polymers with side chain biphenyl groups as mesogenic entities.

J. Polym. Sci., 19, 1427(1981) by Paleos et al describes the synthesis of liquid crystalline polymers which are prepared by the interaction of poly(acryloyl chloride) with mesogenic compounds such as p-aminobiphenyl.

Other publications which describe polymers with side chain induced crystallinity include Polymer, 25, 1342(1984); Eur. Polym. J., 21, No. 7, 645(1985); Polymer, 26, 615(1985); and references cited therein.

The above listed publications are incorporated herein by reference.

There is continuing interest in the theory and practice of polymers which are characterized by an oriented state of comb-like side chain structures.

There is also an increasing research effort to develop new nonlinear optical organic systems for prospective novel phenomena and devices adapted for laser frequency conversion, information control in optical circuitry, light valves and optical switches. The potential utility of organic materials with large second order and third order nonlinearities for very high frequency application contrasts with the bandwidth limitations of conventional inorganic electrooptic materials.

Accordingly, it is an object of this invention to provide novel polymers with pendant side chains which can be aligned by application of an external field.

It is another object of this invention to provide thermotropic liquid crystalline polymers having mesogenic side chains which exhibit nonlinear optical response.

It is a further object of this invention to provide optical switch and light modulator devices with a transparent polymeric optical component comprising a polymer with pendant side chains that exhibit nonlinear optical response.

Other objects and advantages of the present invention shall become apparent from the accompanying description and examples.

DESCRIPTION OF THE INVENTION

One or more objects of the present invention are accomplished by the provision of a polymer which is characterized by a recurring monomeric unit corresponding to the formula:

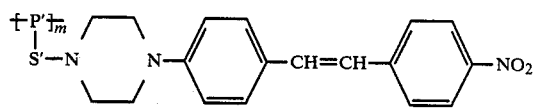

where P' is a polymerized main chain vinyl monomeric structure; m is an integer of at least 3; and S' is a flexible spacer group having a linear chain length of between about 3-20 atoms.

Illustrative of the polyvinyl main chain in the above formula is a polymer which contains one or more recurring monomeric units such as acrylate, vinyl halide, vinyl carboxylate, alkene, alkadiene, arylvinyl, and the like. The monomer species are exemplified by methacrylate, vinyl chloride, vinyl acetate, ethylene, propylene, isobutylene, 1-butene, isoprene, styrene, and the like.

The linear spacer group typically is a straight chain aliphatic radical composed mainly of methylene atoms, and which can include heteroatoms such as oxygen, sulfur and nitrogen.

In another embodiment this invention provides a polymer which is characterized by a recurring monomeric unit corresponding to the formula:

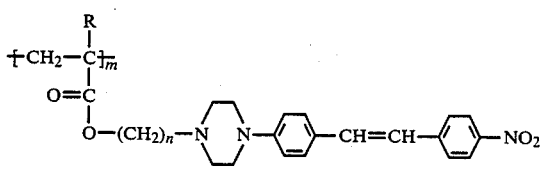

where R is hydrogen or a $C_1$-$C_4$ alkyl group; m is an integer of at least 3; and n is an integer with a value between about 2-20.

An invention polymer has a molecular weight in the range between about 1500-500,000, and typically has a weight average molecular weight in the range between about 2000-200,000.

An invention polymer is composed of at least 10 weight percent of the recurring monomeric units illustrated in the formulae above, which units contain the pendant side chains that exhibit nonlinear optical response. Preferably, the polymer contains at least about 70 weight percent of the recurring monomeric units, so as to provide a high level of nonlinear optical response.

An invention polymer normally will have a glass transition temperature in the range between about 40°-120° C.

Essentially all of the invention polymers exhibit thermotropic liquid crystalline properties. Structurally they represent polyvinyl liquid crystalline polymers with mesogenic side chains which exhibit nonlinear optical response.

In another embodiment this invention provides a nonlinear optical medium comprising a centrosymmetric or noncentrosymmetric configuration of polymer molecules characterized by a recurring monomeric unit corresponding to the formula:

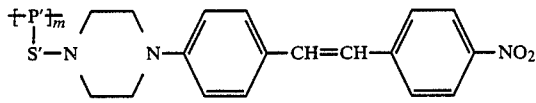

where P' is a polymerized main chain vinyl monomeric structure; m is an integer of at least 3; and S' is a flexible spacer group having a linear chain length of between about 3-20 atoms.

In another embodiment this invention provides a nonlinear optical medium comprising a centrosymmetric or noncentrosymmetric configuration of polymer molecules characterized by a recurring monomeric unit corresponding to the formula:

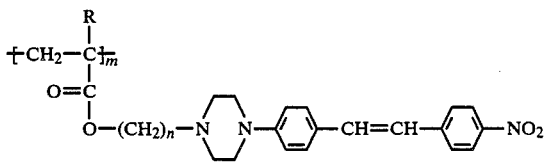

where R is hydrogen or a $C_1$-$C_4$ alkyl group; m is an integer of at least 3; and n is an integer with a value between about 2-20.

A nonlinear optical medium with a centrosymmetric configuration of polymer molecules as defined herein can exhibit third order nonlinear optical susceptibility $X^{(3)}$ of at least about $1 \times 10^{-12}$ esu as measured at 1.91 μm excitation wavelength.

A nonlinear optical medium with a noncentrosymmetric configuration of polymer molecules as defined herein can exhibit second order nonlinear optical susceptibiltiy $X^{(2)}$ of at least about $1 \times 10^{-6}$ esu as measured at 1.91 μm excitation wavelength.

In another embodiment this invention provides an optical switch or light modulator device with an organic nonlinear optical component consisting of a transparent solid medium comprising a polymer which is characterized by a recurring monomeric unit corresponding to the formula:

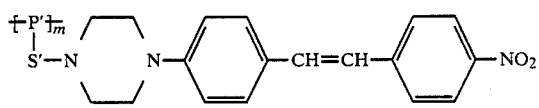

where P' is a polymerized main chain vinyl monomeric structure; m is an integer of at least 3; and S' is a flexible spacer group having a linear chain length of between about 3-20 atoms.

In a further embodiment this invention provides an optical switch or light modulator device with an organic nonlinear optical component consisting of a transparent solid medium comprising a polymer which is characterized by a recurring monomeric unit corresponding to the formula:

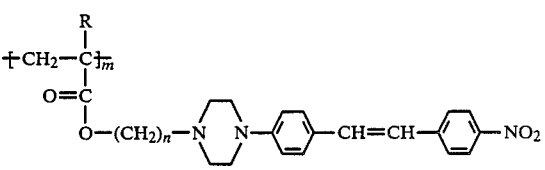

where R is hydrogen or a $C_1$-$C_4$ alkyl group; m is an integer of at least 3; and n is an integer with a value between about 2-20.

An invention optical switch or light modulator device typically will have a transparent solid medium of a thermotropic liquid crystalline polymer which has a stable orientation of an external field-induced alignment of side chain mesogens.

The term "transparent" as employed herein refers to an optical medium which is transparent or light transmitting with respect to incident fundamental light frequencies and created light frequencies. In a nonlinear optical device, a present invention nonlinear optical medium component is transparent to both the incident and exit light frequencies.

A present invention polymer has a novel combination of structural features which contribute to the desirable physicochemical and optical properties characteristic of the polymers.

The pendant side chain mesogens contain structural elements which correspond substantially to 4-N,N-dimethylamino-4'- nitrostilbene (DANS). This is an important feature since DANS exhbitis one of the highest measured nonlinear optical response for any known organic structure, as reported by D. J. Williams in Angew. Chem. Int. Ed. Engl., 25, 690 (1984).

Another particularly significant structural feature of a present invention polymer is the juxtaposition of a piperazine ring in conjugation with the nitrostilbene moiety.

One advantage of the piperazine ring is a structurally restrained nitrogen atom which allows a maximum orbital overlap for high β nonlinear optical susceptibility in the DANS type of extended delocalized π electron conjugation.

Another advantage of the piperazine ring is a second nitrogen atom which introduces an added degree of flexibility to the pendant side chains. The enhanced flexibility beneficially moderates the glass transition temperature of the polymer and facilitates the processability of the polymers for the purposes of thin film formation, or external field-induced molecular orientation, or the like.

Synthesis Of Polymers With Pendant Side Chains

The preparation of a polyvinyl polymer with mesogenic side chains is illustrated by the following flow diagram:

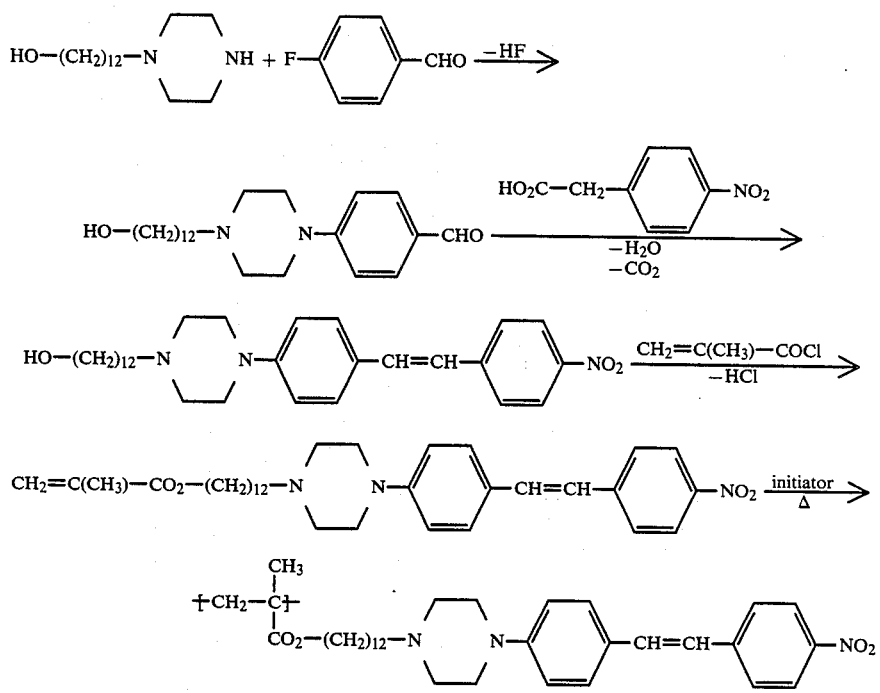

Nonlinear Optical Properties

The fundamental concepts of nonlinear optics and their relationship to chemical structures can be expressed in terms of dipolar approximation with respect to the polarization induced in an atom or molecule by an external field.

As summarized in the ACS Symposium Series 233(1983) listed hereinabove in the Background Of The Invention section, the fundamental equation (1) below describes the change in dipole moment between the ground state $\mu_g$ and an excited state $\mu_e$ expressed as a power series of the electric field E which occurs upon interaction of such a field, as in the electric component of electromagnetic radiation, with a single molecule. The coefficient $\alpha$ is the familiar linear polarizability, $\beta$ and $\gamma$ are the quadratic and cubic hyperpolarizabilities, respectively. The coefficients for these hyperpolarizabilities are tensor quantities and therefore highly symmetry dependent. Odd order coefficients are nonvanishing for all structures on the molecular and unit cell level. The even order coefficients such as $\beta$ are zero for those structures having a center of inversion symmetry on the molecular and/or unit cell level.

Equaltion (2) is identical with (1) except that it describes a macroscopic polarization, such as that arising from an array of molecules in a liquid crystalline domain:

$$\Delta\mu = \mu_e - \mu_g = \alpha E + \beta EE + \gamma EEE + \quad (1)$$

$$P = P_0 + X^{(1)}E + X^{(2)}EE + X^{(3)}EEE + \quad (2)$$

Light waves passing through an array of molecules can interact with them to produce new waves. This interaction may be interpreted as resulting from a modulation in refractive index or alternatively as a nonlinearity of the polarization. Such interaction occurs most efficiently when certain phase matching conditions are met, requiring identical propagation speeds of the fundamental wave and the harmoic wave. Birefringent crystals often posses propagation directions in which the refractive index for the fundamental $\omega$ and the second harmonic $2\omega$ are identical so that dispersion may be overcome.

The term "phase matching" as employed herein refers to an effect in a nonlinear optical medium in which a harmonic wave is propagated with the same effective refractive index as the incident fundamental light wave. Efficient second harmonic generation requires a nonlinear optical medium to possess propagation directions in which optical medium birefringence cancels the natural dispersion, i.e., the optical transmission of fundamental and second harmonic frequencies is phase matched in the medium. The phase matching can provide a high conversion percentage of the incident light to the second harmonic wave.

A present invention thin film polymer medium typically is optically transparent and exhibits hyperpolarization tensor properties such as second harmonic and third harmonic generation, and the linear electrooptic (Pockels) effect. For second harmonic generation, the bulk phase of the polymer medium whether liquid or solid does not possess a real or orientational average inversion center. The substrate is a macroscopic noncentrosymmetric structure.

Harmonic generation measurements relative to quartz can be performed to establish the value of second order and third order nonlinear susceptibility of the optically clear substrates.

In the case of macroscopic nonlinear optical substrates that are composed of noncentrosymmetric sites on the molecular and domain level, the macroscopic second order nonlinear optical response $\chi^{(2)}$ is comprised of the corresponding molecular nonlinear optical response $\beta$. In the rigid lattice gas approximation, the macroscopic susceptibility $X^{(2)}$ is expressed by the following relationship:

$$X_{ijk}(-\omega_3; \omega_1,\omega_2) = Nf^{\omega_3}f^{\omega_2}f^{\omega_1} <\beta_{ijk}(-\omega_3; \omega_1,\omega_2)>$$

wherein N is the number of sites per unit volume, f represent small local field correlations, $\beta_{ijk}$ is averaged over the unit cell, $\omega_3$ is the frequency of the created optical wave, and $\omega_1$ and $\omega_2$ are the frequencies of the incident fundamental optical waves.

These theoretical considerations are elaborated by Garito et al in chapter 1 of the ACS Symposium Series 233 (1983); and by Lipscomb et al in J. Chem., Phys., 75, 1509 (1981), incorporated by reference. See also Lalama et al, Phys. Rev., A20, 1179 (1979); and Garito et al, Mol., Cryst. and Liq. Cryst., 106, 219 (1984); incorporated by reference.

External Field Induced Liquid Crystal Orientation

The term "external field" as employed herein refers to an electric, magnetic or mechanical stress field which is applied to a substrate of mobile organic molecules, to induce dipolar alignment of the molecules parallel to the field.

Liquid crystals (including polymeric liquid crystals) may be aligned by the application of an external field to a matrix of liquid crystal molecules. The degree of orientation is determined by the orientational order parameter. For both nematic and smectic mesophases, the parameter is defined in terms of a director which is a vector parallel to the molecular long axis (and perpendicular to the plane of molecular layering in the case of the smectic mesophase).

If theta is defined as the angle between the director and a chosen axis, then the orientational order parameter is defined as the average over all molecules of the second Legendre polynomial. The parameter ranges from $-0.5$ to 1.0 (1.0 corresponds to perfect uniaxial alignment along a given axis. 0.0 corresponds to random orientation, and $-0.5$ corresponds to random orientation confined in a plane perpendicular to a given axis).

The order parameter thus defined does not distinguish between parallel and antiparallel alignment. Thus, a sample of asymmetric rod-like molecules would have an order parameter of 1.0 for both the case in which the molecules are colinear and all pointed in the same direction, and the case in which the molecules are colinear and form antiparallel pairs.

The application of an orienting external field to an array of nematic liquid crystal molecules results in an order parameter of approximately 0.65. Deviations from ideal order are due to nematic fluctuations on a micron length scale which accommodate characteristic defects. These fluctuations may be dynamic for small molecule liquid crystals or frozen for polymeric liquid crystals. In either case, nematic fluctuations scatter light so that aligned samples appear to be hazy (particularly in a thick sample).

Smectic liquid crystals may be aligned by application of an orienting external field, with a resulting order parameter exceeding 0.9. Unlike the nematic phase, characteristic defects are removed upon aligning the smectic phase and thereby forming a single liquid crystal phase. Such phases are known as monodomains and, because there are no defects, are optically clear.

For both the nematic and smectic mesophases, application of a DC electric field produces orientation by torque due to the interaction of the applied electric field and the net molecular dipole moment. The molecular dipole moment is due to both the permanent dipole moment (i.e., the separation of fixed positive and negative charge) and the induced dipole moment (i.e., the separation of positive and negative charge by the applied field).

The torque which results by the application of a DC electric field normally would only produce very slight alignment even for high dipolar and polarizable molecules at room temperature. The alignment torque is negligible in comparison with the disordering effect of thermally induced rotation (i.e., the Boltzman distribution of rotational eigenstates at room temperature). However, due to the unique associations developed by liquid crystalline molecules through intermolecular forces, long range orientation order on a micron length scale is present. Under these conditions, bulk orientation of the sample by application of aligning fields exceeding a few volts/cm can produce the degrees of alignment indicated above.

Application of an AC electric field also can induce bulk alignment. In this case, orienting torque occurs solely due to the interaction of the applied AC field and the induced dipole moment. Typically, AC field strengths exceeding 1 kV/cm at a frequency exceeding 1 KHz are employed for the nematic phase. At these frequencies, rotational motion of aligned neumatic regions is not sufficient to follow the field. As a direct result, torque due to the interaction of the applied field and any permanent dipole moment over time averages to zero. However, electronically induced polarization is a very rapid process so that the induced dipole moment changes direction depending upon the direction of the applied field resulting in a net torque.

Application of a magnetic field also can effect alignment. Organic molecules do not possess a permanent magnetic dipole moment. In a manner analogous to AC electric field, a magnetic field can induce a net magnetic dipole moment. Torque results from the interaction of the induced dipole moment and the external magnetic field. Magnetic field strengths exceeding 10 Kgauss are sufficient to induce alignment for a nematic phase.

Alignment of nematics by electric or magnetic fields are accomplished simply by application of the field to the nematic material. Alignment of the smectic phase is more difficult due to a higher viscosity which decreases rotational freedom. Formation of aligned smectic monodomains can be achieved by orienting a material in the nematic phase, and cooling the material into the smectic phase while maintaining the aligning field. For materials which have only smectic and isotropic phases and which lack a nematic phase, alignment can be accomplished in the smectic phase at an elevated temperature near the smectic to isotropic transition temperature, e.g., sufficiently close to the transition temperature so that the medium may contain smectic domains in an isotropic fluid.

Mechanical stress induced alignment is applicable to both the smectic and nematic mesophases. Strong aligning mechanical stress propagates throughout a solid liquid crystalline material due to the natural tendency of these media to self align. Specific mechanical stress methods include stretching a thin film, or coating a liquid crystalline surface with an aligning polymer such as nylon. Physical methods (e.g., stretching) rely upon the rigid and geometrically asymmetric character of certain liquid crystalline molecules to induce bulk orientation. Chemical methods (e.g., coating the surface with an aligning polymer) rely upon strong intermolecular interactions to induce surface orientation. All of the methods described above to produce oriented materials apply to both small molecule liquid crystals and polymeric liquid crystals. For polymers which possess a glass transition, the aligned liquid crystalline phase can be frozen by rapid cooling below the glass transition temperature.

Publications relating to external field-induced liquid crystal molecular orientation include The Physics of Liquid Crystals, P.G. deGennes, p. 95–97, Oxford University Press, 1974; J. Stamatoff et al, "X-Ray Diffraction Intensities of a Smectic-A Liquid Crystal", Phys. Rev. Letters, 44, 1509–1512, 1980; J.S. Patel et al, "A Reliable Method of Alignment for Smectic Liquid Crystals", Ferroelectrics, 59, 137–144, 1984; J. Cognard, "Alignment of Nematic Liquid Crystals and Their Mixtures", Mol. Cryst. Liq. Cryst.:Suppl., 1982; incorporated herein by reference.

The following examples are further illustrative of the present invention. The components and specific ingredients are presented as being typical, and various modifications can be derived in view of the foregoing disclosure within the scope of the invention.

EXAMPLE I

This Example illustrates the preparation of poly[4-[N-(2-methacroyloxyethyl)piperazinyl]-4'-nitrostilbene] in accordance with the present invention.

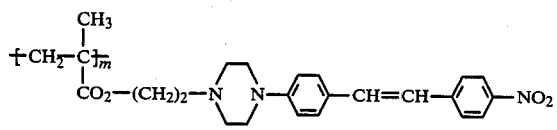

A.

4-[N-(2-Hydroxyethyl)piperazinyl]benzaldehyde

A two liter three necked flask fitted with a mechanical stirrer, thermometer and condenser is charged with 304 g of 2-hydroxyethylpiperazine, 74.4 g of 4-fluorobenzaldehyde, 1 ml of Aliquat 336, 750 ml of dimethylsulfoxide, and 82.8 g of anhydrous potassium carbonate. The mixture is heated at 95° C. for three days. The reaction mixture then is cooled and poured into 3 liters of ice water. The resultant solid precipitate is filtered, washed with water, and vacuum dried. The crude solid is recrystallized from toluene: m.p. 105°–107° C.

B.

4-[N-(2-Hydroxyethyl)piperazinyl]-4'-nitrostilbene

A one liter three necked flask fitted with a dropping funnel, mechanical stirrer, and condenser is charged with 34.35 g of 4-nitrophenylacetic acid. Piperidine (16.2 g) is added dropwise over a period of 30 minutes. At the end of the addition period, 44.46 g of 4-[N-(2-hydroxyethyl)piperazinyl]benzaldehyde is added. The mixture is heated at 100° C. for three hours, and at 130° C. for three hours. After cooling, the resultant semi-solid mass is ground up in ethanol in a blender, then filtered, washed with water, and vacuum dried. The crude solid is recrystallized from chlorobenzene: m.p. 221°–224° C.

C.

4-[N-(2-Methacroyloxyethyl)piperazinyl]-4'-nitrostilbene

A one liter three necked flask fitted with a thermometer, condenser, dropping funnel with argon inlet and magnetic stirrer is charged with 5 g of 4-[N-(2-hydroxyethyl)piperazinyl]-4'-nitrostilbene, 5 g of triethylamine, and 400 ml of dichloromethane. The reaction mixture is heated to 35° C., and 2 g of methacroyl chloride is added dropwise over a 30 minute period. After stirring at 35° C. for 4 hours, another 2 g of methacroyl chloride is added and the reaction mixture is stirred overnight at 35° C. The resultant product solution is extracted three times with distilled water, dried over magnesium sulfate, and then the solvent is evaporated. The crude solid is vacuum dried and recrystallized from acetonitrile: m.p. 176°–179° C.

D.

Poly[4-[N-(2-methacroyloxyethyl)piperazinyl]-4'-nitrostilbene]

The monomer (2 g) is dispersed in 20 ml of chlorobenzene, and the resultant suspension is degassed. A solution of azodiisobutytonitrile in chlorobenzene is added to provide a level of azodiisobutyronitrile equal to one mole percent.

The reactor is capped and placed in an 80° C. oil bath for a period of about 18 hours. The reaction product mixture then is poured into methanol to precipitate the polymer. The solid polymer is recovered by filtration, and vacuum dried.

EXAMPLE II

This Example illustrates the preparation of a 50/50 copolymer of methyl methacrylate and 4-[N-(2-hydroxyethyl(piperazinyl]-4'-nitrostilbene.

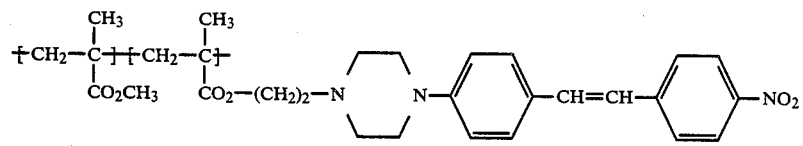

The monomer (2 g) of Example I is suspended in 20 ml of chlorobenzene, and the resultant suspension is degassed for one hour. To the suspension are added 0.475 g of methyl methacrylate (4.75 ml of a 10% solution in chlorobenzene) and one mole percent of azodiisobutyronitrile.

The polymerization procedure of Example I then is followed to provide the illustrated 50/50 copolymer product.

EXAMPLE III

This Example illustrates the preparation of poly[4-[N-(6-p-vinylbenzoyloxyhexyl)piperazinyl]-4'-nitrostilbene].

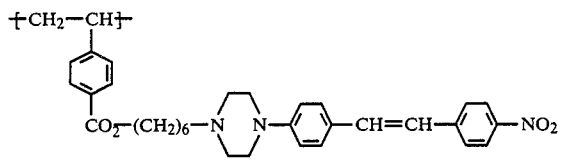

The monomer is prepared following the procedure of Example I, except that 6-hydroxyhexylpiperazine is used in place of 2-hydroxypiperazine, and p-vinylbenzoyl chloride is used in place of methacroyl chloride.

The polymer is prepared by polymerizing the monomer in the manner of Example I.

EXAMPLE IV

This Example illustrates a poling procedure for producing a second order nonlinear optical side chain liquid crystalline polymer medium in accordance with the present invention.

A. Poling Cell Construction

A poling cell is constructed from electrically conductive glass plates, such as Donnelly MIrror PD 5007-7. The glass plates are washed with sulfuric acid, isopropanol, 1-dodecanol, and isopropanol, with a distilled water rinse between each washing step.

The poling cell is a sandwich type cell in which the conductive glass surfaces are in facing proximity and are separated by a polyimide film of approximately 25 micrometer thickness. A thin layer of epoxy adhesive is applied on the surfaces of the polyimide film to hold the glass plates.

After the epoxy is completely cured, the cell is washed with isopropanol and rinsed with distilled water. After drying, the cell is stored in a dry box.

B. Filling The Poling Cell

Poly[4-[N-(2-methacroyloxyethyl)piperazinyl]-4'-nitrostilbene] of Example I is placed in a vacuum oven and maintained in a melt phase at a temperature of about 120° C. for about 4 hours to eliminate entrained air bubbles from the polymer melt.

The liquid crystalline polymer melt is introduced into the space between the glass plates by charging a drop of the polymer melt to one of the openings of the poling cell space and placing the cell assembly in a vacuum oven maintained at a temperature approximately 10° C. above the clearing temperature of the liquid crystalline polymer. The cell space fills gradually by capillary action. The space filing period is about 4 hours for a 0.5 cm long space. The liquid crystalline polymer melt in the filled cell is bubble-free.

C. Electrical Field Induced Orientation

Two lead wires are attached to each of the conductive glass surfaces using electrically conductive epoxy adhesive. The poling assembly is placed in a microscope hot stage (Mettler FP-82 with FP-80 Central Processor), and the sample is observed with a polarizing microscope (Leitz Ortholux Pol) for alignment.

The microscope is switched into a photodiode (Mettler Photometer No. 17517) to record the change of light intensity upon application of an electric field. The two lead wires are connected to an AC voltage amplifier (Electro-Optic Developments LA10A), which amplifies the voltage signal from a signal generator (Hewlett-Packard No. 3310B).

The poling cell first is heated to 85° C. to bring the liquid crystal polymer to the isotropic phase. The assembly then is cooled at a rate of 0.2° C./min. until the photodiode signal registers an abrupt increase which indicates that the melt (about 60° C.) has undergone a transition into a liquid crystalline phase. The temperature is further lowered by 2° C. and then maintained at this temperature.

The AC voltage source is set at 500 V, and the frequency is set at 2000 Hz. The power to the poling cell is turned on to apply an electric field across the liquid crystalline sample. The field strength is calculated to be approximately $2 \times 10^5$ V/cm. About three seconds after the electric field is applied, the photodiode signal drops close to the baseline, indicating that orientation development induced by the electric field is completed. At this point, the cooling is resumed until the temperature reaches 35° C., and the poling assembly is disconnected from the power source.

When the poling assembly is removed from the microscope hot stage, by visual observation the liquid crystalline polymer in the cell space is transparent. This is an indication that the molecular orientation is uniform and homogeneous throughout the sample. Orientation of the sample is further ascertained utilizing a wide angle X-ray diffraction technique, and the Hermann's orientation factor of the sample is approximately 0.9.

D. High Field Poling For Symmetry Control

The oriented liquid crystal sample is subjected further to a higher electric field to develop a noncentrosymmetric orientation of nonlinear optical moieties which are a part of the side chains of the polymer.

The poling cell assembly is heated to 40° C., which is approximately 5° C. below the glass transition temperature of the polymer. Then the lead wires of the poling assembly are connected to a DC voltage source (Kepco OPS-3500) and the voltage is turned up slowly until it reaches 2000 V. At this point, the electric field strength across the sample is about $8 \times 10^5$ V/cm. The sample is maintained at this field strength level for 24 hours, and then the voltage source is disconnected. A noncentrosymmetrically oriented liquid crystalline polymer matrix is obtained when the cell sample is cooled.

The noncentrosymmetry of the sample is determined from the wide angle X-ray diffraction measurement and the thermally stimulated electrical discharge measurement. The Hermann's orientation function from the X-ray measurement is approximately 0.9.

From the measurements, there is an indication that a major proportion of the nonlinear optical moieties are aligned parallel to the electric field direction, and the rest are oriented antiparallel to the electric field direction.

What is claimed is:

1. A polymer which is characterized by a recurring monomeric unit corresponding to the formula:

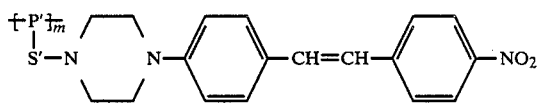

where P' is a polymerized main chain vinyl monomeric structure; m is an integer of at least 3; and S' is a flexible spacer group having a linear chain length of between about 3-20 atoms.

2. A polymer in accordance with claim 1 wherein the molecular weight of the polymer is between about 1500-500,000.

3. A polymer in accordance with claim 1 wherein the recurring monomeric units comprise at least 10 weight percent of the total polymer weight.

4. A polymer in accordance with claim 1 wherein the polymer has a glass transition temperature between about 40°-120° C.

5. A polymer which is characterized by a recurring monomeric unit corresponding to the formula:

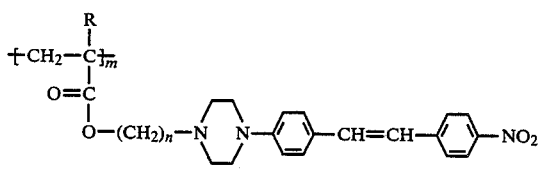

where R is hydrogen or a $C_1-C_4$ alkyl group; m is an integer of at least 3; and n is an integer with a value between about 2-20.

6. A polymer in accordance with claim 5 wherein the molecular weight of the polymer is between about 2000-200,000.

7. A polymer in accordance with claim 5 wherein the recurring monomeric units comprise at least 10 weight percent of the total polymer weight.

8. A polymer in accordance with claim 5 wherein the polymer has a glass transition temperature between about 40°-120° C.

9. A polymer in accordance with claim 5 wherein the polymer exhibits thermotropic liquid crystalline properties.

10. A polymer in accordance with claim 5 wherein the polymer contains recurring copolymerized vinyl halide monomeric structures.

11. A polymer in accordance with claim 5 wherein the polymer contains recurring copolymerized styrene monomeric structures.

12. A polymer in accordance with claim 5 wherein the R group in the structural formula is hydrogen or methyl.

13. A nonlinear optical medium comprising a centrosymmetric configuration of polymer molecules characterized by a recurring monomeric unit corresponding to the formula:

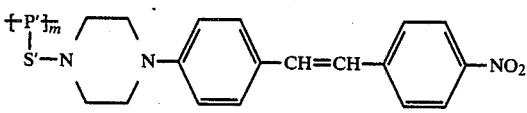

where P' is a polymerized main chain vinyl monomeric structure; m is an integer of at least 3; and S' is a flexible spacer group having a linear chain length of between about 3-20 atoms.

14. A nonlinear optical medium comprising a centrosymmetric configuration of polymer molecules characterized by a recurring monomeric unit corresponding to the formula:

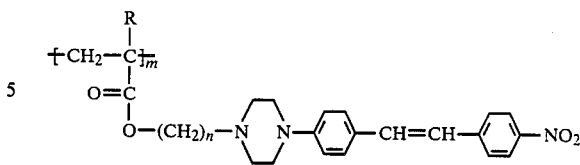

where R is hydrogen or a $C_1-C_4$ alkyl group; m is an integer of at least 3; and n is an integer with a value between about 2-20.

15. A nonlinear optical medium in accordance with claim 14 wherein the medium exhibits third order nonlinear optical susceptibility $X^{(3)}$ of at least about $1 \times 10^{-12}$ esu as measured at 1.91 μm excitation wavelength.

16. A nonlinear optical medium comprising a noncentrosymmetric configuration of polymer molecules characterized by a recurring monomeric unit corresponding to the formula:

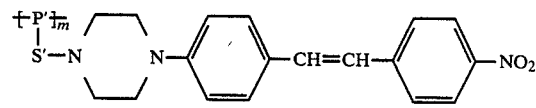

where P' is a polymerized main chain vinyl monomeric structure; m is an integer of at least 3; and S' is a flexible spacer group having a linear chain length of between about 3-20 atoms.

17. A nonlinear optical medium comprising a noncentrosymmetric configuration of polymer molecules characterized by a recurring monomeric unit corresponding to the formula:

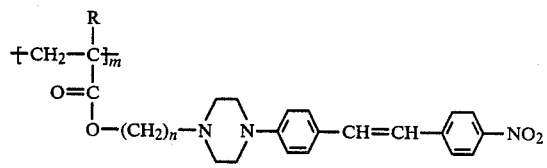

where R is hydrogen or a $C_1-C_4$ alkyl group; m is an integer of at least 3; and n is an integer with a value between about 2-20.

18. A nonlinear optical medium in accordance with claim 17 wherein the noncentrosymmetric configuration of molecules in the medium is external field-induced.

19. A nonlinear optical medium in accordance with claim 17 wherein the medium exhibits second order nonlinear susceptibility $X^{(2)}$ of at least about $1 \times 10^{-6}$ esu as measured at 1.91 μm excitation wavelength.

20. An optical switch or light modulator device with an organic nonlinear optical component consisting of a transparent solid medium comprising a polymer which is characterized by a recurring monomeric unit corresponding to the formula:

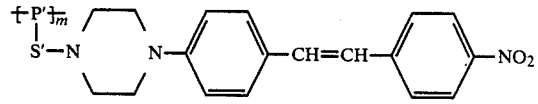

where P' is a polymerized main chain vinyl monomeric structure; m is an integer of at least 3; and S' is a flexible spacer group having a linear chain length of between about 3-20 atoms.

21. An optical switch or light modulator device with an organic nonlinear optical component consisting of a transparent solid medium comprising a polymer which is characterized by a recurring monomeric unit corresponding to the formula:

$$\begin{array}{c} R \\ \mathrm{+CH_2-C\!\!\!\!\!\!\!-\!\!\!\!\!-}_m \\ \mathrm{O\!\!=\!\!C} \\ \mathrm{O\!-\!(CH_2)_n\!-\!N\!\!\bigcirc\!\!N\!-\!\!\bigcirc\!\!-CH\!\!=\!\!CH\!-\!\!\bigcirc\!\!-NO_2} \end{array}$$

where R is hydrogen or a $C_1$-$C_4$ alkyl group; m is an integer of at least 3; and n is an integer with a value between about 2-20.

* * * * *